United States Patent
Heo et al.

(10) Patent No.: US 11,626,896 B2
(45) Date of Patent: Apr. 11, 2023

(54) HIGH FREQUENCY COMMUNICATION APPARATUS AND METHOD FOR VEHICLE

(71) Applicant: Samsung Electronics Co., Ltd., Gyeonggi-do (KR)

(72) Inventors: Young Heo, Gyeonggi-do (KR); Houn Baek, Gyeonggi-do (KR); Jeonghoon Lee, Gyeonggi-do (KR); Jihyuk Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/097,124

(22) Filed: Nov. 13, 2020

(65) Prior Publication Data

US 2021/0152206 A1 May 20, 2021

(30) Foreign Application Priority Data

Nov. 15, 2019 (KR) .................. 10-2019-0146951

(51) Int. Cl.
*H04B 1/12* (2006.01)
*H04B 1/04* (2006.01)
(Continued)

(52) U.S. Cl.
CPC ........... *H04B 1/126* (2013.01); *H04B 1/0458* (2013.01); *H04B 1/1607* (2013.01); *H04B 1/44* (2013.01);
(Continued)

(58) Field of Classification Search
CPC ........ H04B 1/005; H04B 1/0053; H04B 1/04; H04B 1/0458; H04B 1/082; H04B 1/126;
(Continued)

(56) References Cited

U.S. PATENT DOCUMENTS 5,502,715 A * 3/1996 Penny .................. H04B 3/36
370/293
5,737,687 A * 4/1998 Martin ................ H04B 1/3877
455/14

(Continued)

FOREIGN PATENT DOCUMENTS

CN 101551693 B * 3/2012 ........... G06F 1/1616
DE 102015217695 A1 3/2017
EP 2983298 A2 10/2016

OTHER PUBLICATIONS

European Search Report dated Apr. 12, 2021.
Office Action dated Feb. 28, 2023.

*Primary Examiner* — Young T. Tse
(74) *Attorney, Agent, or Firm* — Cha & Reiter, LLC

(57) ABSTRACT

Provided is a high frequency communication apparatus and method for vehicle. The high frequency communication apparatus for vehicle includes a communication module configured to process a radio frequency (RF) signal; a cable having one end connected to the communication module; and an antenna module connected to the other end of the cable and configured to transmit through an antenna the RF signal delivered from the communication module, the antenna module including a compensator configured to compensate for a loss of the RF signal in the cable and a controller configured to determine an amount of compensation for the loss in the cable based on power of the RF signal transmitted from the compensator.

18 Claims, 10 Drawing Sheets

(51) Int. Cl.
*H04B 1/16* (2006.01)
*H04B 1/44* (2006.01)

(52) U.S. Cl.
CPC ............... *H04B 2001/0408* (2013.01); *H04B 2001/0416* (2013.01)

(58) Field of Classification Search
CPC .......... H04B 1/16; H04B 1/1607; H04B 1/40; H04B 1/44; H04B 1/54; H04B 1/56; H04B 3/03; H04B 3/48; H04B 3/54; H04B 3/548; H04B 2001/0408; H04B 2001/0416; H04L 5/14; H04L 5/1407; H04L 5/1415; H04L 5/22
USPC ....... 375/219, 220, 224, 254, 257, 285, 296, 375/297; 370/278, 280, 282, 294; 455/500, 501, 63.1, 67.13, 67.14, 68, 69, 455/70, 78, 114.3, 115.1, 115.2, 127.1, 455/127.2
See application file for complete search history.

(56) References Cited

U.S. PATENT DOCUMENTS

| | | | |
|---|---|---|---|
| 6,230,031 | B1 | 5/2001 | Barber |
| 6,590,506 | B1 | 7/2003 | Oouchi |
| 6,690,922 | B1* | 2/2004 | Lindemann .......... H03G 3/3047 455/522 |
| 9,191,903 | B2 | 11/2015 | Sasson |
| 9,488,493 | B2 | 11/2016 | McaNeille et al. |
| 10,021,652 | B2 | 7/2018 | Gossner et al. |
| 10,038,508 | B1* | 7/2018 | Kerselaers .......... H04B 17/104 |
| 10,136,398 | B2 | 11/2018 | Morhart et al. |
| 2005/0250541 | A1* | 11/2005 | Bird ...................... H04W 88/08 455/561 |
| 2007/0099667 | A1* | 5/2007 | Graham ................ H01Q 1/007 455/562.1 |
| 2017/0047962 | A1* | 2/2017 | Gururaj .................... H04B 1/44 |
| 2019/0123434 | A1 | 4/2019 | Haggerty |
| 2019/0132024 | A1* | 5/2019 | Zhan ........................ H04B 3/10 |
| 2020/0274219 | A1* | 8/2020 | Pehlke .................... H03F 3/245 |

* cited by examiner

HIGH FREQUENCY COMMUNICATION APPARATUS AND METHOD FOR VEHICLE

CROSS-REFERENCE TO RELATED APPLICATION

This application is based on and claims priority under 35 U.S.C. § 119 to Korean Patent Application No. 10-2019-0146951, filed on Nov. 15, 2019, in the Korean Intellectual Property Office, the disclosure of which is incorporated by reference herein in its entirety.

BACKGROUND

1. Field

One or more embodiments of the instant disclosure generally relate to a high frequency communication apparatus and method for vehicle.

2. Description of Related Art

Vehicles are commonly known as machines for transportation, which move by reaction from friction of wheels attached to the car body against the road surface caused by artificial power rather than human or animal power. Vehicles may include, for example, three- or four-wheel vehicles, two-wheel vehicles such as motorcycles, construction machinery, bicycles, train traveling along rail tracks, and the like.

A vehicle may be equipped with electronic devices that provide various kinds of information to provide entertainment to the user (e.g., the driver and/or passenger) and other user convenience. An electronic device may do this by receiving and processing or not processing an external signal, and there are many different kinds of electronic devices for vehicle released on the market. Signals required to operate these electronic devices may be received through a communication apparatus for vehicle. As the amount of information to be provided for the vehicle and the user increases, high frequency communication such as communication using 5th generation (5G) or vehicle to everything (V2X) protocols is required. V2X communication is a communication scheme that enables autonomous and safe driving through connection and communication of vehicle to vehicle, vehicle to infrastructure, vehicle to pedestrian, etc., and uses e.g., the 5.9 GHz frequency band. Likewise, 5G communication supports high data rate and low latency using high frequencies of 3.5 GHz or higher. A communication module and an antenna module may be installed a few meters away from each other in the vehicle due to design constraints, in which case the high frequency may result in signal loss in the cable connecting the communication module and the antenna module.

SUMMARY

One or more embodiments of the instant disclosure provide a high-frequency communication apparatus and method for vehicle, capable of compensating for signal attenuation in the cable connecting a communication module to an antenna module.

Technical objectives of the disclosure are not limited thereto, and there may be other technical objectives.

Additional aspects will be set forth in part in the description which follows and, in part, will be apparent from the description, or may be learned by practice of the presented embodiments of the disclosure.

According to an aspect of the disclosure, a high frequency communication apparatus for vehicle includes: a communication module configured to process a radio frequency (RF) signal; a cable having one end connected to the communication module; and an antenna module connected to the other end of the cable and configured to transmit, through an antenna, the RF signal delivered from the communication module, the antenna module including a compensator configured to compensate for a loss of the RF signal in the cable and a controller configured to determine an amount of compensation for the loss in the cable based on power of the RF signal transmitted from the compensator.

The compensator may include an amplifier for transmission, and a variable attenuator arranged in front of the amplifier for transmission and configured to be able to adjust an attenuation level.

The amplifier for transmission may include at least one of a pre-amplifier or a low noise amplifier.

The antenna module may further include a detection circuit configured to detect power of the RF signal amplified by the amplifier for transmission.

The antenna module may further include a memory storing information about self-calibration.

The RF signal may be transmitted or received according to a time division duplex scheme or a frequency division duplex scheme.

The communication module may transmit a transmission (TX)/reception (RX) control signal to control an TX mode or an RX mode for the RF signal to the antenna module through the cable, and the antenna module may further include an TX/RX switch configured to receive the TX/RX control signal and switch between the TX mode and the RX mode for the RF signal.

The controller of the antenna module may output and transmit an RX serial communication signal to the communication module, the communication module may receive the RX serial communication signal, and the RX serial communication signal may include information about self-calibration of the antenna module.

The communication module may output and transmit an TX serial communication signal to the antenna module, the controller of the antenna module may receive the TX serial communication signal, and the TX serial communication signal may include a control command for self-calibration of the antenna module.

The RF signal, the TX/RX control signal, the TX serial communication signal, and the RX serial communication signal may all have different frequencies.

The communication module may supply power to the antenna module through the cable.

The cable may include a coaxial cable.

According to another aspect of the disclosure, an antenna module connected through a cable to a communication module configured to process a radio frequency (RF) signal, and to transmit through an antenna the RF signal sent from the communication module, includes: a compensator configured to compensate for a loss of the RF signal in the cable; and a controller configured to control an amount of compensation of the compensator based on power of the RF signal transmitted from the compensator.

According to another aspect of the disclosure, a high frequency communication method for vehicle includes starting cable loss check; receiving a test RF signal from a communication module through a cable; detecting power of the test RF signal amplified by a compensator; determining an amount of compensation for a loss in the cable based on the power of the RF signal transmitted from the compensator; and compensating the RF signal transmitted from the communication module based on the amount of compensation of the compensator.

The starting of the cable loss check may include receiving a control command requesting the start of the cable loss check from the communication module, connecting a line of an antenna switch to an equivalent load for test, setting the amount of compensation of the compensator to a preset value, and switching a transmission (TX)/reception (RX) switch into an TX mode.

The preset value for the amount of compensation of the compensator may include a calibration value obtained from a previous calibration or a known loss value of the cable.

The high frequency communication method for vehicle may further include notifying the communication module that cable loss check is ready, and the detecting of the power of the test RF signal may include detecting power of the test RF signal amplified by the compensator.

The determining of the amount of compensation for a loss in the cable may include detecting the power of a test RF signal amplified by the compensator while sweeping an attenuation level of a variable attenuator of the compensator in a preset sweep range, and comparing the detected power of the test RF signal with power of the test RF signal output from the communication module.

When the power of the test RF signal detected while sweeping the attenuation level of the variable attenuator of the compensator in a preset sweep range does not meet a target level, the high frequency communication method for vehicle may further include sending an error message to the communication module.

The high frequency communication method for vehicle may further include switching into a normal mode where the input line of an antenna switch is connected to the antenna.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
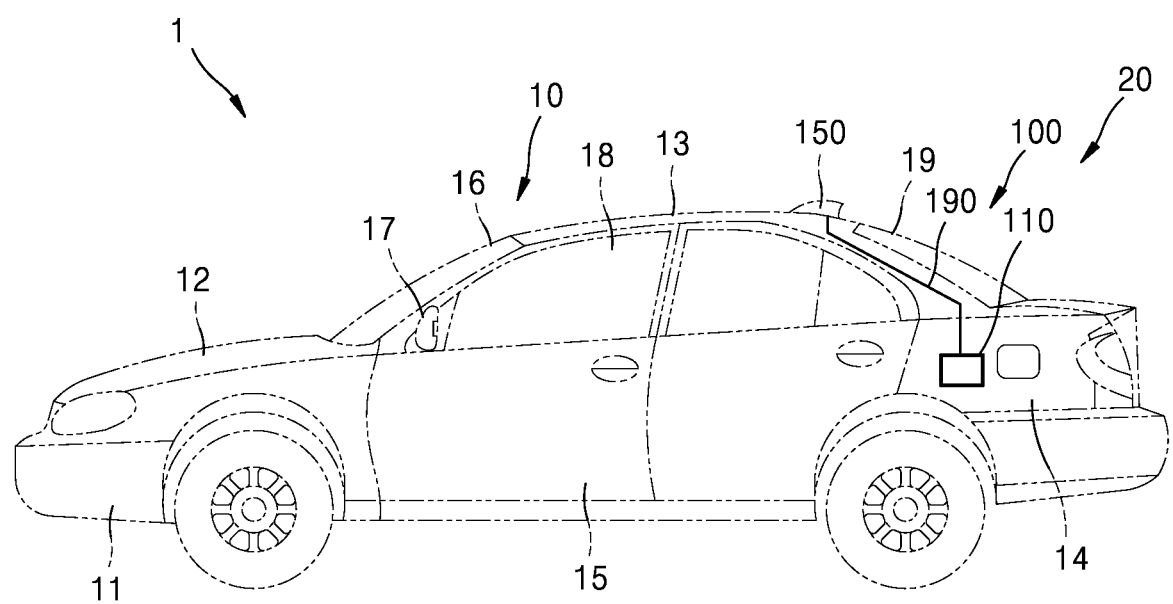
FIG. 1 shows a car body of a vehicle, according to an embodiment of the disclosure.

Embodiments of the disclosure will now be described with reference to accompanying drawings. Like reference numerals indicate like elements in the drawings, and the elements may be exaggerated in size for clarity and convenience of explanation. Embodiments of the disclosure as will be described below are illustrative examples, and there may be various modifications to the embodiments of the disclosure.

The terms are selected from among common terms widely used at present, taking into account principles of the disclosure, which may however depend on intentions of those of ordinary skill in the art, judicial precedents, emergence of new technologies, and the like. Some terms as herein used are selected at the applicant's discretion, in which case, the terms will be explained later in detail in connection with embodiments of the disclosure. Therefore, the terms should be defined based on their meanings and descriptions throughout the disclosure.

It is to be understood that the singular forms "a," "'an," and "the" include plural references unless the context clearly dictates otherwise. The term "include (or including)" or "comprise (or comprising)" is inclusive or open-ended and does not exclude additional, unrecited elements or method steps, unless otherwise mentioned.

The terms "Unit," "module," "block," etc., as used herein each represent a unit for handling at least one function or operation, and may be implemented in hardware, software, or a combination thereof.

Throughout the disclosure, the expression "at least one of a, b or c" indicates only a, only b, only c, both a and b, both a and c, both b and c, all of a, b, and c, or variations thereof.

The expression "configured to" as herein used may be interchangeably used with "suitable for," "having the capacity to," "designed to," "adapted to," "made to," or "capable of" according to the given situation. The expression "configured to" may not necessarily mean "specifically designed to" in terms of hardware. For example, in some situations, an expression "a system configured to do something" may refer to "an entity able to do something in cooperation with" another device or parts. For example, "a processor configured to perform A, B and C functions" may refer to a dedicated processor, e.g., an embedded processor for performing A, B, and C functions, or a general purpose processor, e.g., a Central Processing Unit (CPU) or an application processor that may perform A, B, and C functions by executing one or more software programs stored in a memory.

Throughout the specification, the term "communication module" may refer to a circuit separated from but connected by a cable to an antenna module in a high frequency communication apparatus for vehicle.

The antenna module may refer to a circuit having an antenna installed directly on a circuit board or connected to an antenna by a very short cable. Herein, the term "very short cable" may refer to a cable that is sufficiently short such that signal loss due to high frequency is negligible. For example, a very short cable may have a length of a few millimeters, a few centimeters, or tens of centimeters.

In the disclosure, the high frequency communication apparatus for vehicle may be used in various communication schemes such as e.g., vehicle to everything (V2X) communication, 4th generation (4G) communication, and fifth generation communication. For example, the V2X communication may include vehicle to vehicle (V2V), vehicle to infrastructure (V2I), vehicle to pedestrian (V2P), vehicle to network (V2N) communications, etc.

Throughout the specification, the term "transmit" and its derivatives mean that a signal is delivered from a communication module to an antenna module via a cable, and the term "receive" and its derivatives mean that a signal is delivered from the antenna module to the communication module. For example, a transmit (TX) radio frequency (RF) signal is sent to the antenna module from the communication module via the cable and then emitted through an antenna. Conversely, a receive (RX) RF signal is received at the antenna and sent to the communication module from the antenna module via the cable FIG. 1 shows a car body of a vehicle, according to an embodiment of the disclosure.

Referring to FIG. 1, a vehicle 1 is a machine that includes wheels that are driven for the purpose of transportation of humans or goods. The vehicle 1 may travel along a road. The vehicle 1 includes a car body 10 defining the external shape of the vehicle 1, a chassis (not shown), the remaining portion of the vehicle 1 other than the car body 10, on which mechanical equipment required for driving is installed, and electric control devices for protecting the driver and provide user convenience for the driver.

As shown in FIG. 1, the exterior of the car body 10 may include a front panel 11, a hood 12, a roof panel 13, a rear panel 14, and front/rear/left/right doors 15. To provide a clear view for the driver, there may be a front window 16 installed on the front of the car body 10, wing mirrors 17 and side windows 18 installed on the sides of the car body 10, and a rear window 19 installed on the rear side of the car body 10.

Electric control devices 20 of the vehicle 1 may control various devices of the vehicle 1 and provide the driver with comfort or safety, and may include at least one of, e.g., an engine management system, a transmission control unit, an electronic braking system, an electric power steering system, a body control module, a display, a heating/ventilation/air conditioning system, an audio system, or a telematics unit. The electric control devices 20 of the vehicle 1 may also include a high frequency communication apparatus 100 so that the vehicle is capable of wireless communication. The high frequency communication apparatus 100 for vehicle may be understood as part of the telematics unit, but is not limited thereto. Furthermore, the high frequency communication apparatus 100 for vehicle may be a device equipped in the vehicle 1 before or after the vehicle 1 is released on the market.

In an embodiment of the disclosure, the high frequency communication apparatus 100 for vehicle may include a communication module 110, an antenna module 150, and a cable 190.

For example, the communication module 110 may be arranged in a space behind rear seats of the car body 10, without being limited thereto. In another example, the communication module 110 may be arranged under the hood 12, near the driver's seat, near the roof panel 13, or the like.

For example, the antenna module 150 may be arranged on a rear side of the roof panel 13, without being limited thereto. In another example, the antenna module 150 may be arranged at the front window 16, the wing mirror 17, the rear window 19, or the like. The antenna module 150 may be detachably coupled to the cable 190 by a connector 251 (see FIG. 4).

In an embodiment of the disclosure, the cable 190 may be a single cable. The cable 190 may be a coaxial cable that electrically connects the communication module 110 to the antenna module 150. The communication module 110 and the antenna module 150 may be installed a few meters away from each other in the vehicle 1 due to their design, but is not limited thereto.

Figure 2:
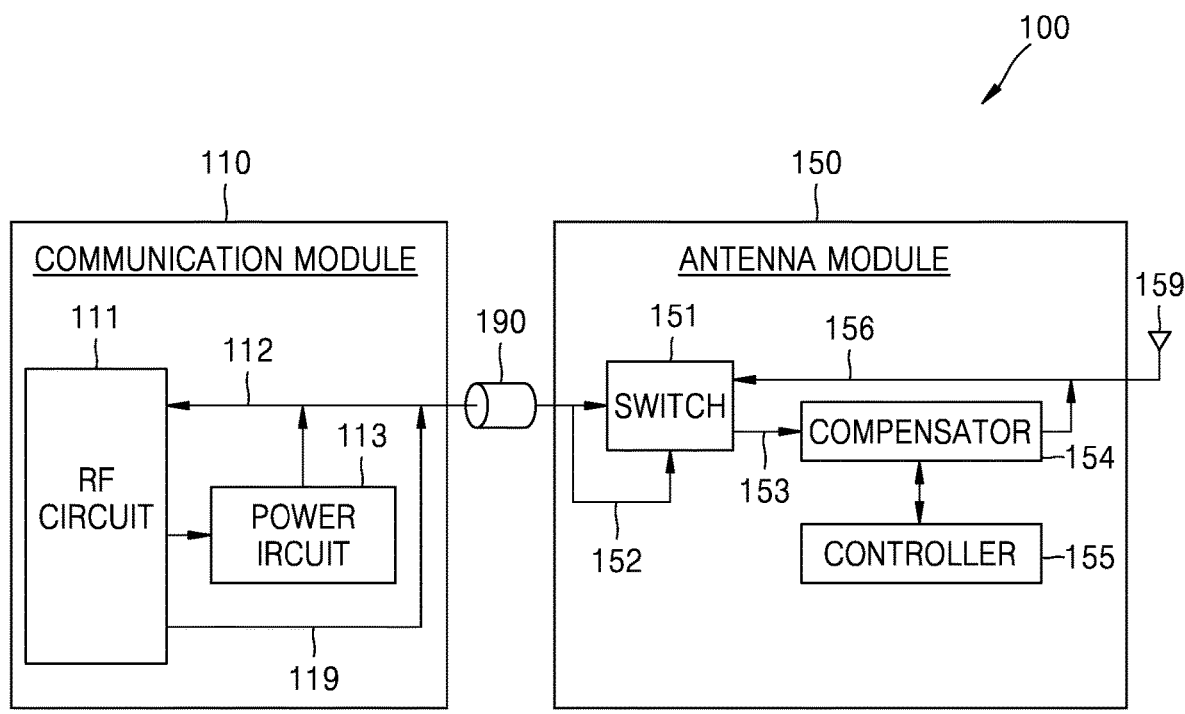
FIG. 2 is a block diagram of a high frequency communication apparatus for vehicle, according to an embodiment of the disclosure.

FIG. 2 is a block diagram of the high frequency communication apparatus 100 for vehicle, according to an embodiment of the disclosure.

Referring to FIG. 2, the high frequency communication apparatus 100 for vehicle may include the communication module 110, the antenna module 150, and the cable 190.

In an embodiment of the disclosure, the communication module 110 may include an RF circuit 111. The RF circuit 111 may be a circuit for processing an RF signal 112, and may include a modem circuit, a radio frequency integrated circuit (RFIC), a radio frequency front end (RFFE), etc. The modem circuit may be a circuit for e.g., 5G or V2X communication. The communication module 110 may be part of the electric control device (e.g., telematics control unit (TCU)) in the vehicle 1, or may be controlled by a processor (e.g., an application processor (AP) of the TCU) of the electric control device. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication module 110 may supply power to the antenna module 150 and in addition output a test RF signal for a certain period of time when receiving a "system on" command to initiate communication from an electronic control circuit belonging or connected to the high frequency communication apparatus 100 for vehicle. The test RF signal is output at preset power, and may be used for self-calibration of the antenna module 150.

The communication module 110 may distinguish between transmission (TX) and reception (RX) of the RF signal 112 by a time division duplexing (TDD) method. The RF circuit 111 may output a TX/RX control signal 119 to distinguish between TX and RX. For example, the TX/RX control signal "1" 119 indicates the TX mode, and is modulated to an alternate current (AC) signal of a certain frequency by a direct current (DC) to AC circuit. The TX/RX control signal "0" 119 indicates the RX mode, and may not include an AC component even after being modulated by the DC to AC circuit. The TX/RX control signal 119 may be modulated and then carried on the cable 190. In an embodiment of the disclosure, modulation of the TX/RX control signal 119 may be performed by the RF circuit 111. The communication module 110 may further include an LC filter, a DC to AC circuit, etc., for modulating the TX/RX control signal 119. The modulated TX/RX control signal 119 may have a different frequency from that of the transmitted or received RF signal.

In an embodiment of the disclosure, the communication module 110 may distinguish between TX and RX of the RF signal 112 by using a frequency division duplexing (FDD) method. In the case of using the FDD method, TX frequency and RX frequency of the RF signal 112 may be differentiated based on frequency. In this case, an extra TX/RX control signal may not be used.

The communication module 110 may further include a power circuit 113. The power circuit 113 may convert power from the vehicle 1 into a voltage required by the high frequency communication apparatus 100. The power circuit 113 may supply the power to various circuits in the antenna module 150 and communication module 110. The power circuit 113 for supplying power to the antenna module 150 may be provided separately from the communication module 110.

The antenna module 150 may include a switch 151, a compensator 154, and a controller 155.

In the case of using the TDD scheme to distinguish between TX and RX, the switch 151 switches between the TX mode and the RX mode according to a TX/RX control signal 152 transmitted through the cable 190. For example, the switch 151 may be a single pole double throw (SPDT) circuit. The switch 151 may switch between the TX mode and the RX mode based on the TX/RX control signal 152 transmitted through the cable 190. For example, when the TX/RX control signal 152 includes an AC component of a certain frequency, the switch 151 switches into the TX mode, and when the TX/RX control signal 152 has no AC component, the switch 151 may switch into the RX mode. The antenna module 150 may further include an LC filter, an AC to DC circuit, etc., for demodulating the TX/RX control signal 152.

In the case of using the FDD scheme to distinguish between TX and RX, a duplexer may be used instead of the switch 151 in an embodiment of the disclosure.

A TX RF signal 153 transmitted through the cable 190 is branched by the switch 151 and directed to the compensator 154. Signal loss may occur while the TX RF signal 153 is passing the cable 190. The longer the cable 190 and the higher the frequency of the TX RF signal 153, the larger the signal loss.

The compensator 154 includes a TX amplifier to compensate for the signal loss of the TX RF signal 153.

The controller 155 determines the amount of compensation of the compensator 154 based on the power of the TX RF signal 153 detected by the compensator 154, and the compensator 154 amplifies the TX RF signal 153 with the amount of compensation determined by the controller 155.

The controller 155 may first perform a self-calibration operation when booted up with the power supplied from the communication module 110. For example, the controller 155 may control the compensator 154 to perform compensation with the set amount (or a calibration value set in previous operations). While the test RF signal is delivered from the communication module 110 for a certain period of time, the controller 155 detects strength of the TX RF signal 153 that has been compensated by the compensator 154 to calculate an amount of loss in the cable 190, or controls the compensator 154 to sweep across a certain compensation range for the strength of the test RF signal to reach a target level.

In an embodiment of the disclosure, the antenna module 150 may further include a power monitoring circuit for monitoring the power supplied to the antenna module 150, and when a monitored voltage level deviates from a set range, the controller 155 may send an error message indicating that there is an error to the communication module 110.

The antenna module 150 may further include a memory (not shown), which may store the target power level of the TX RF signal 153. The controller 155 may amplify the power of the TX RF signal 153 to the target power level by adjusting the compensation value of the compensator 154.

In an embodiment of the disclosure, the cable 190 may be a coaxial cable. The coaxial cable is a coaxial transmission line having a cross-section of concentric circles, including an inner conductor and an outer conductor, such that current or signal may be transmitted with minimal loss. For example, polyethylene steatite insulation may be placed between the inner conductor and the outer conductor, to mechanically lock the inner conductor and outer conductor in their appropriate positions and reduce attenuation.

A TX RF signal and a TX/RX control signal may be transmitted to the antenna module 150 from the communication module 110 via the cable 190. DC power may be transmitted to the antenna module 150 from the communication module 110 via the cable 190. An RX RF signal may be transmitted to the communication module 110 from the antenna module 150 via the cable 190. These signals may all be modulated at different frequencies and carried on the cable 190, and a receiving end may receive a signal of a desired frequency by using a band pass filter suited for that frequency.

Operation of the antenna module 150 (e.g., operation of the controller 155) does not depend on the communication module 110. For example, the TX RF signal 153 transmitted through the cable 190 may be compensated by circuits (i.e., the compensator 154 and the controller 155) in the antenna module 150. In the meantime, the transmitted or received RF signal, TX/RX control signal, and DC power may be standardized such that the antenna module 150 may be normally operated in the communication module 110 of a different manufacturer. This can be contrasted with the conventional art, where in existing high frequency communication apparatuses for vehicles, RF signal compensation is performed at the side of a communication module or by the antenna module under the control of the communication module, i.e., the antenna module is dependent on the communication module in compensating the RF signal.

Figure 3:
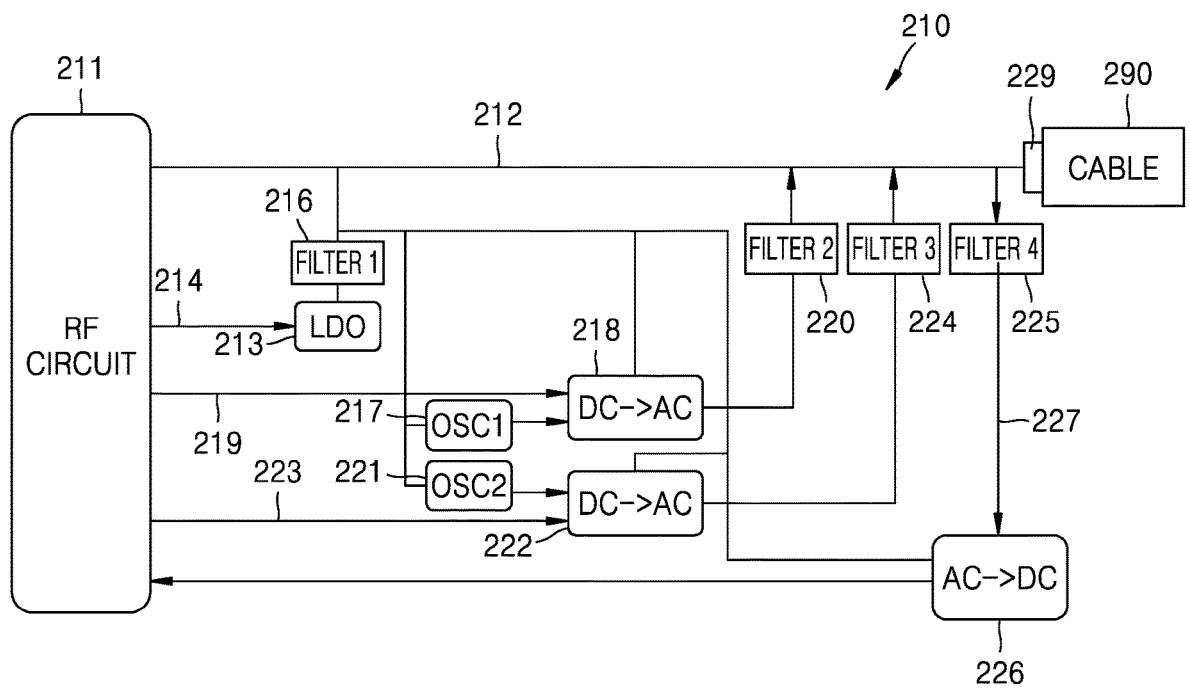
FIG. 3 is a block diagram of a communication module, according to an embodiment of the disclosure.
Figure 4:
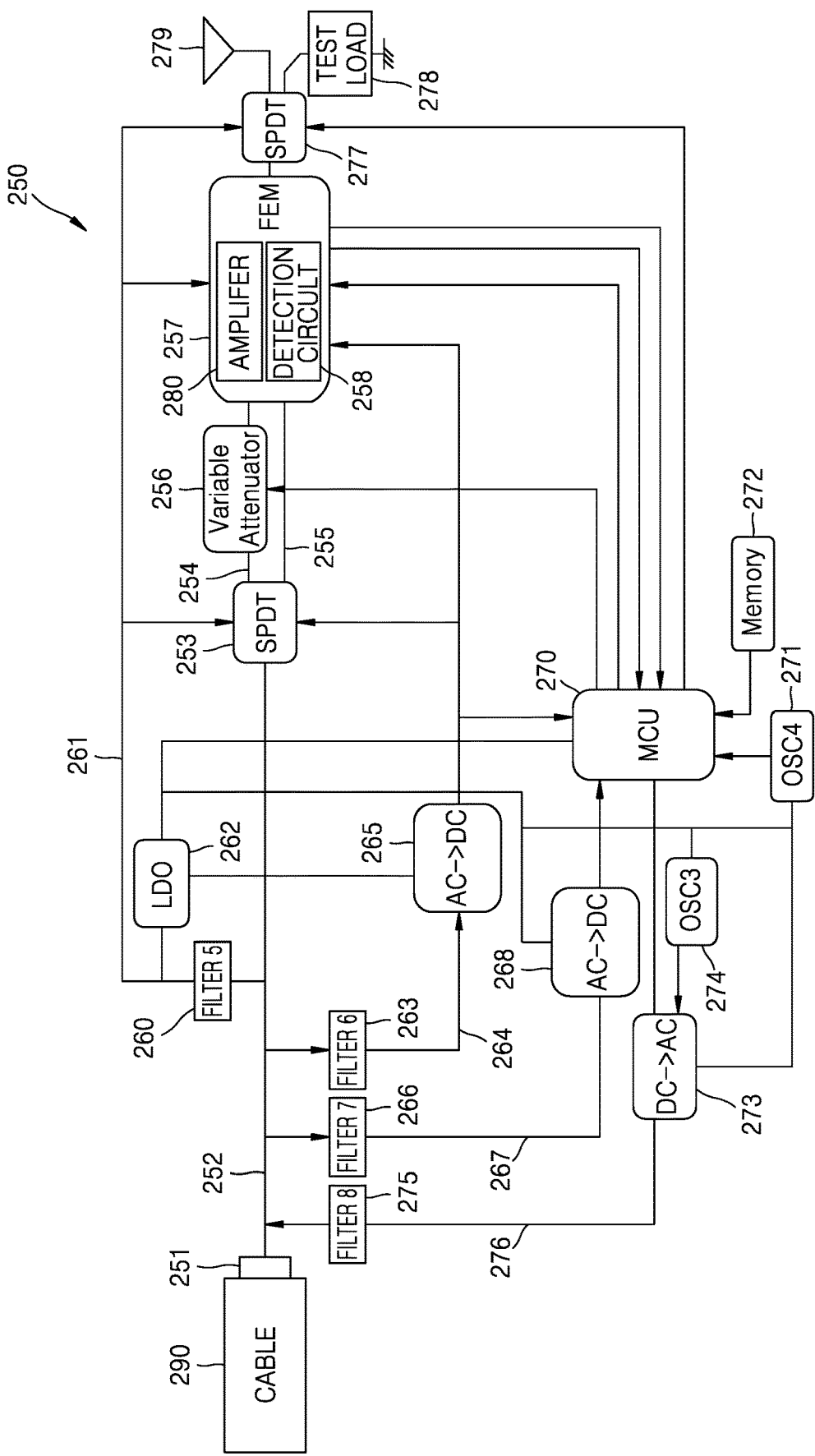
FIG. 4 is a block diagram of an antenna module, according to an embodiment of the disclosure.

FIG. 3 is a block diagram of a communication module 210, and FIG. 4 is a block diagram of an antenna module 250. A high frequency communication apparatus for vehicle may include the communication module 210 of FIG. 3 and the antenna module 250 of FIG. 4 connected to each other by a cable 290.

Referring to FIG. 3, the communication module 210 may include an RF circuit 211. The RF circuit 211 may be a circuit for processing an RF signal 212 transmitted or received, and may include a modem circuit, an RFIC, an RFFE, etc. The modem circuit may be a circuit for e.g., 5G or V2X communication. The communication module 210 may be part of an electronic control device in the vehicle or may be controlled by a processor of an electronic control device.

The RF signal 212 is transmitted or received through the cable 290. There is a connector 229 coupled to the cable 290. The connector 229 may be a RAKRA coaxial connector, but is not limited thereto.

The RF circuit 211 may output a test TX RF signal for self-calibration.

The communication module 210 may further include a power circuit 213 for supplying power to various circuits in the communication module 210 and to the antenna module 250. The power circuit 213 may convert power from the vehicle 1 into a voltage (e.g., 5 volts (V)) required by the communication module 110. The power circuit 213 may include e.g., a low-dropout regulator (LDO). When the RF circuit 211 sends an enable signal to the power circuit 213, the power circuit 213 supplies DC power. The DC power supplied from the power circuit 213 is filtered by a first filter 216 and carried on the cable 290 along with an RF signal. The first filter 216 may be an RF block filter for preventing an RF signal from entering to the power circuit 213.

The communication module 210 may further include a modulation circuit for control signals and serial communication. The RF circuit 211 may output a TX/RX control signal 219 that is distinguished from TX and RX of the RF signal 212.

As described above, the communication module 210 may use the TDD method. For example, the TX/RX control signal "1" 219 may indicate the TX mode, and may be modulated to an AC signal by a first DC to AC circuit 218. The TX/RX control signal '0' 219 indicates the RX mode, and may not include an AC component even after being modulated by the first DC to AC circuit 218. The TX/RX control signal 219 may be modulated and filtered by a second filter 220, and then carried on the cable 290. The second filter 220 may be a band pass filter. A frequency signal required by the first DC to AC circuit 218 is supplied by a first oscillator 217.

In an embodiment of the disclosure, the communication module 210 may include a serial communication module for transmitting or receiving a serial communication signal. The serial communication module may be a universal asynchronous receiver/transmitter (UART) module, without being limited thereto. The serial communication module may be arranged in the RF circuit 211 or arranged separately.

For example, a TX serial communication signal 223 (e.g., UART TXD) output from the RF circuit 211 may be a digital signal comprised of 0(s) and 1(s), and modulated to an AC signal by a second DC to AC circuit 222. The TX serial communication signal 223 may be modulated and filtered by a third filter 224, and then carried on the cable 290. The third filter 224 may be a band pass filter. A frequency signal required by the second DC to AC circuit 222 is supplied by a second oscillator 221.

The TX serial communication signal 223 may include a control command for the antenna module 250 to perform the operation to compensate for loss in the cable 290 or to perform self-calibration operation.

In an embodiment of the disclosure, the communication module 210 may not include a circuit for transmitting the TX serial communication signal 223. In this case, the compensation operation or self-calibration operation may be automatically started whenever the antenna module 250 is powered on.

In the meantime, an RX serial communication signal 227 may be transmitted from the antenna module 250 through the cable 290. The RX serial communication signal 227 transmitted from the antenna module 250 may be an AC signal modulated in the antenna module 250, as will be described later. The modulated RX serial communication signal 227 passes a fourth filter 225 and is then converted to a digital signal by a first AC to DC circuit 226. The fourth filter 225 may be a band pass filter. The RX serial communication signal 227 converted to the digital signal may be a digital signal e.g., according to UART communication (UART RXD).

The RX serial communication signal 227 may include information regarding the compensation operation and the self-calibration operation performed by the antenna module 250. For example, the RX serial communication signal 227 may include information indicating the start of the compensation operation or self-calibration operation of the antenna module 250, or a diagnosis message corresponding to the result of the self-calibration.

The antenna module 250 may further include a circuit for performing other functions in addition to transmission or reception of the RF signal, in which case the TX or RX serial communication signal 223 or 227 may include information regarding the other functions.

The frequency of the RF signal 212, the frequency of the modulated TX/RX control signal 219, the frequency of the modulated TX serial communication signal 223, and the frequency of the modulated RX serial communication signal 227 may all be in different frequency bands. For example, the frequency of the RF signal 212 may be in the 5.9 GHZ band. The frequency of the modulated TX/RX control signal 219 may be 110 MHz. In this case, the frequency of the first oscillator 217 and the band pass frequency of the second filter 220 may be 110 MHz. For example, the frequency of the modulated TX serial communication signal 223 may be 65 MHz. In this case, the frequency of the second oscillator 221 and the band pass frequency of the third filter 224 may be 65 MHz. For example, the frequency of the modulated RX serial communication signal 227 may be 2 MHz.

The antenna module 250 may include a power circuit 262. The power circuit 262 may convert DC power 261 delivered from the communication module 210 through the cable 290 into a voltage (e.g., 3.3V) required by the antenna module 250 and supply the voltage to various circuits and elements in the antenna module 250. The power circuit 262 may include e.g., an LDO. A fifth filter 260 may be placed between the power circuit 262 and the cable 290. The fifth filter 260 may be an RF block filter for preventing an RF signal from entering to the power circuit 262.

The antenna module 250 may include a TX/RX switch 253, a variable attenuator 256, a front end module (FEM) 257, and a controller 270.

In the case of using the TDD scheme to distinguish between TX and RX, the TX/RX switch 253 switches between the TX mode and the RX mode according to a TX/RX control signal 264 transmitted through the cable 290. For example, the TX/RX switch 253 may be a Single Pole Double Throw (SPDT) circuit. The TX/RX switch 253 may switch between the TX mode and the RX mode based on the TX/RX control signal 264 transmitted through the cable 290. For example, the TX/RX control signal 264 transmitted through the cable 290 passes a sixth filter 263 and is sent to a second AC to DC circuit 265 and demodulated to a digital signal. The sixth filter 263 may be a band pass filter having its pass band as the frequency of the TX/RX control signal 219 modulated in the communication module 210. When the TX/RX control signal 264 transmitted through the cable 290 has an AC component of a certain frequency, it is converted by the second AC to DC circuit 265 to '1' which causes the TX/RX switch 253 to switch into the TX mode. When the TX/RX control signal 264 has no AC component, it is converted by the second AC to DC circuit 265 to '0' which causes the TX/RX switch 253 to switch into the RX mode.

The TX/RX switch 253 forwards the TX RF signal 254 transmitted through the cable 290 to the variable attenuator 256 in the TX mode. The TX/RX switch 253 blocks the line to the variable attenuator 256 and forwards the RX RF signal 255 received from the FEM 257 onto the cable 290 in the RX mode.

The FEM 257 may include an amplifier 280. The amplifier may include a pre-amplifier (PA) or a low noise amplifier (LNA), or a combination of them.

The FEM 257 may have a plurality of gain modes that may be selected under the control of the communication module 210. For example, the plurality of gain modes may include a low power mode and a high power mode.

In another example, the FEM 257 may have a single gain mode.

The FEM 257 may further include a detection circuit 258 for detecting power of the TX RF signal amplified in the FEM 257. The detection circuit 258 may be arranged outside the FEM 257. The detected power information of the TX RF signal may be sent to the controller 270.

The variable attenuator 256 is a circuit for reducing signal strength without distortion of the waveform of the signal, where the attenuation is variable. An attenuation level of the variable attenuator 256 may be determined by the controller 270. Power amplification level at the FEM 257 may be controlled by adjusting the attenuation level of the variable attenuator 256. The variable attenuator 256 may be a voltage-controlled variable attenuator in which the attenuation level is controlled by the voltage of the controller 270.

The variable attenuator 256 and the amplifier of the FEM 257 may be understood as a compensator for compensating for signal attenuation in the cable 290.

The controller 270 may be a micro controller unit (MCU). The controller 270 may control general operation of the antenna unit 250 including the variable attenuator 256 and the FEM 257.

The controller 270 determines an attenuation level of the variable attenuator 256 to compensate for a loss of the TX RF signal 254 in the cable 290, based on the power information of the TX RF signal sent from the FEM 257.

The TX serial communication signal 267 transmitted from the communication module 210 through the cable 290 passes a seventh filter 266 and is sent to a third AC to DC circuit 268 and demodulated to a digital signal. The seventh filter 266 may be a band pass filter having its pass band as the frequency of the TX serial communication signal 223 modulated in the communication module 210.

The communication module 210 may not include a circuit for transmitting the TX serial communication signal 267, in which case the seventh filter 266 and the third AC to DC circuit 268 may not be included in the antenna module 250.

The controller 270 may receive the TX serial communication signal 267 transmitted from the communication module 210 and perform a certain operation. The TX serial communication signal 267 may be a command to check loss in the cable 290, a command to stop checking the loss in the cable 290, or a command to start self-calibration, and the controller 270 may receive the control command and control the variable attenuator 256 and the FEM 257 to perform the self-calibration operation.

The controller 270 may control an antenna switch 277 to connect its input line (i.e. the line on the left of the antenna switch 277 shown in FIG. 4) to an equivalent load for test 278 instead of the antenna 279 in the self-calibration operation mode, to prevent a test RF signal from being emitted through the antenna 279 when the test RF signal is output from the communication module 210. When the self-calibration operation mode is terminated, the controller 270 controls the antenna switch 277 to connect the input line to the antenna 279. The antenna switch 277 may be an SPDT circuit, but is not limited thereto. The equivalent load for test 278 may have the resistance of 50 ohm, and may be grounded.

The controller 270 may send an RX serial communication signal 276 to the communication module 210. The RX serial communication signal 276 is a digital signal comprised of 0(s) and 1(s), and modulated to an AC signal by a third DC to AC circuit 273. The RX serial communication signal 276 may be modulated and filtered by an eighth filter 275, and then carried on the cable 290. The eighth filter 275 may be a band pass filter. A frequency signal required by the third DC to AC circuit 273 is supplied by a third oscillator 271.

The RX serial communication signal 276 may include information regarding the self-calibration operation.

The antenna module 250 may further include a circuit for performing other functions in addition to transmission or reception of the RF signal, in which case the RX serial communication signal 276 may include a control signal for the circuits for performing the other functions.

The antenna module 250 may include a memory 272. The memory 272 stores a test RF signal output value. The memory 272 may further store at least one of a target output value of the TX RF signal 254, an attenuation level control range (sweep range), or a compensation value obtained in the process of the self-calibration operation (i.e., an adjusted attenuation level of the variable attenuator 256).

In an embodiment of the disclosure, the cable 290 may be a coaxial cable. A TX RF signal 254, a TX/RX control signal 264, and a TX serial communication signal 267 may be transmitted to the antenna module 250 from the communication module 210 via the cable 290. DC power may be transmitted to the antenna module 250 from the communication module 210 via the cable 290. An RX RF signal and the RX serial communication signal 276 may be transmitted to the communication module 210 from the antenna module 250 via the cable 290. These signals may all be modulated at different frequencies and carried on the cable 290, and the receiving ends for these signals may receive the signal of desired frequency by using a band pass filter suited for the frequency. For example, the band pass frequencies of the sixth to eighth filters 263, 266, and 275 or the frequency of the third oscillator 274 may be determined to correspond to frequencies of the TX and RX signals at the communication module 210. For example, the frequency of the modulated TX/RX control signal 264 may be 110 MHz, in which case the band pass frequency of the sixth filter 263 may be 110 MHz. For example, the frequency of the modulated TX control signal 264 may be 65 MHz, in which case the band pass frequency of the seventh filter 266 may be 65 MHz. For example, the frequency of the modulated RX serial communication signal 276 may be 2 MHz, in which case the frequency of the third oscillator 274 and the band pass frequency of the eighth filter 275 may be 2 MHz.

Although TX and RX may be distinguished by the TDD scheme in the embodiment of the disclosure in connection with FIGS. 3 and 4, the FDD scheme may be used to distinguish between the TX and RX. In this case, TX frequency and RX frequency of the RF signal 252 may be differentiated, and a duplexer may be used instead of the TX/RX switch 253.

Figure 5:
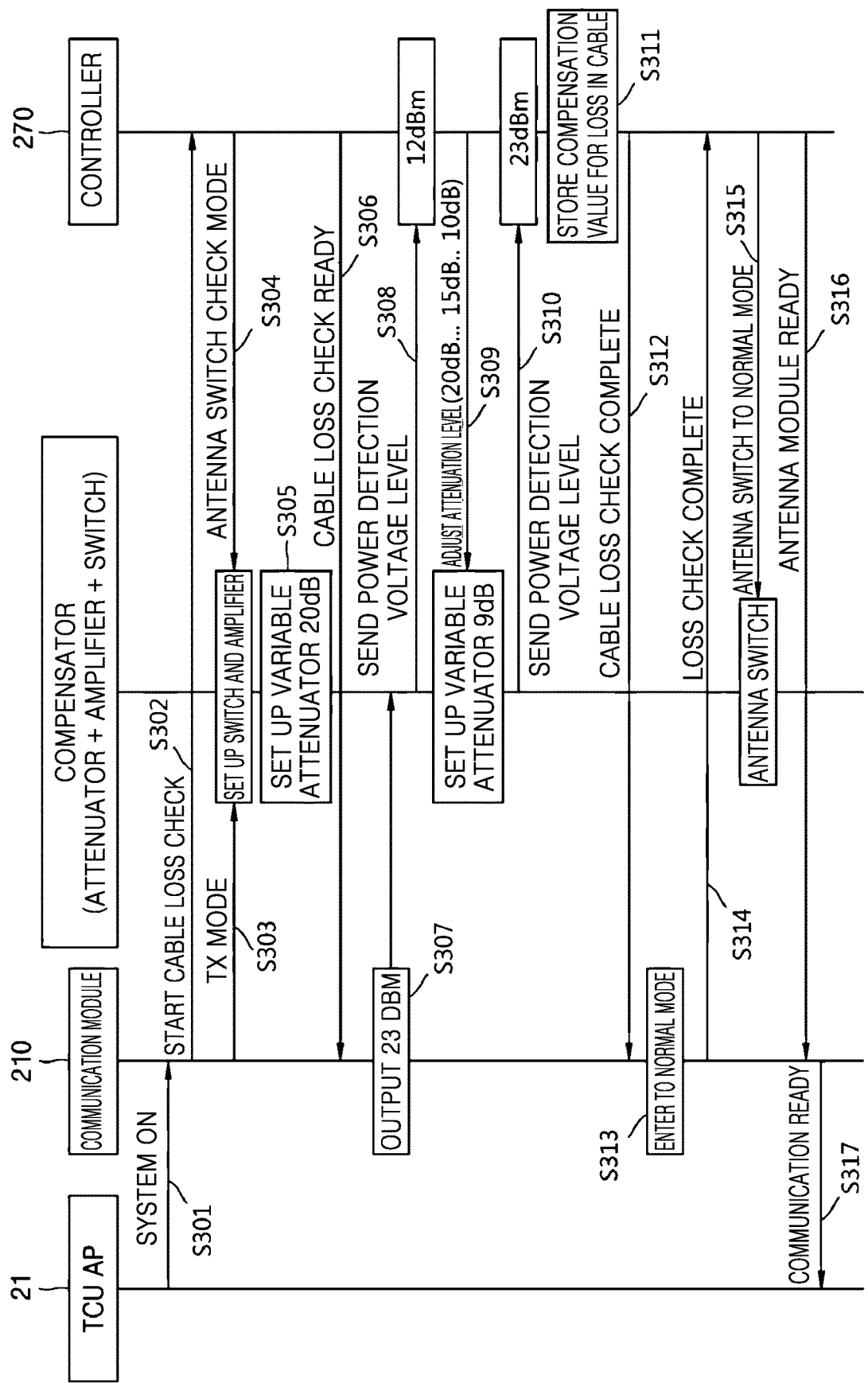
FIG. 5 is a flowchart illustrating a method of operating a high frequency communication apparatus for vehicle, according to an embodiment of the disclosure.

FIG. 5 is a flowchart illustrating a method of operating a high frequency communication apparatus for vehicle, according to an embodiment of the disclosure.

Referring to FIG. 5, the communication module 210 of the high frequency communication apparatus for vehicle receives a system activation command from a processor (e.g., TCU AP) 21 of the electronic control device in operation S301, and then transmits to the antenna module 250 a control command to request the start of cable loss check in operation S302. The start of cable loss check is not limited to the system activation command of the processor 21 of the electronic control device. In another example, the start of cable loss check is made frequently or periodically. The antenna module 250 may be always powered on or may be powered on before receiving the command for the start of cable loss check. The command for the start of cable loss check may be included in the TX serial communication signal (e.g., UART TXD) 223 (see FIG. 3). The TX serial communication signal transmitted to the antenna module 250 from the communication module 210 may further include a control command to set up a gain mode of the FEM 257.

Furthermore, the communication module 210 transmits the TX/RX control signal 219 (e.g., '1') indicating the TX mode to the antenna module 250, in operation S303.

The controller 270 of the antenna module 250 receives the control command 267 (see FIG. 4) to request the start of cable loss check, and starts self-calibration. In other words, the controller 270 controls the antenna switch 277 into a check mode, in operation S304. The antenna switch 277 connects the line of the antenna switch 277 to the equivalent load for test 278 (see FIG. 4) in the check mode. Furthermore, the TX/RX switch 253 of the antenna module 250 receives the TX/RX control signal 264 (see FIG. 4) for TX mode and switches into the TX mode. The TX/RX switch 253 directs the RF signal 252 transmitted through the cable 290 to the variable attenuator 256 in the TX mode.

The FEM 257 may have a plurality of gain modes, in which case the communication module 210 may transmit a gain mode setup control command to set up a gain mode of the FEM 257 to the antenna module 250. When receiving the gain mode setup control command from the communication module 210, the controller 270 sets up a gain mode of the FEM 257 according to the gain mode setup command.

The FEM 257 sets an attenuation level of the variable attenuator 256 to an initial attenuation level, in operation S305. For example, the initial attenuation level may be 20 dB.

The controller 270 notifies the communication module 210 that cable loss check is ready.

When receiving from the controller 270 of the antenna module 250 the notification that cable loss check is ready, the communication module 210 outputs a test RF signal at certain power for the self-calibration operation of the antenna module 250 in operation S307. For example, the output power of the test RF signal from the communication module 210 may be 23 dBm, without being limited thereto. The output power of the test RF signal from the communication module 210 is known by the antenna module 250 in advance. For example, the memory 272 of the antenna module 250 may have stored information about the output power of the test RF signal from the communication module 210 at the time of shipment or installation in the vehicle.

The variable attenuator 256 of the antenna module 250 receives and attenuates the test RF signal to the initial attenuation level, and enters the result to the FEM 257. The FEM 257 detects power of the amplified test RF signal. For example, the FEM 257 may detect a voltage level of the amplified test RF signal. The detected power of the test RF signal is forwarded to the controller 270, in operation S308.

For example, the detected power of the test RF signal may be 12 dBm. The controller 270 compares the detected power value of the test RF signal with the output information of the test RF signal from the communication module 210 to determine an attenuation level to compensate for the loss in the cable 290 and adjusts the attenuation level of the variable attenuator 256, in operation S309. The FEM 257 detects the adjusted power of the test RF signal and forwards the adjusted power value of the test RF signal to the controller 270, in operation S310. For example, when the output power of the test RF signal from the communication module 210 is 23 dBm and the detected power of the test RF signal at the initial attenuation level 20 dB of the variable attenuator 256 is 12 dBm, the FEM 257 may be able to make the input test RF signal have power of 23 dBm by adjusting the attenuation level of the variable attenuator 256 to 9 dB. In other words, the controller 270 may compensate for loss in the cable 290 by adjusting the attenuation level of the variable attenuator 256. The controller 270 may store the compensation value for compensating the adjusted power of the test RF signal (i.e., the adjusted attenuation level of the variable attenuator 256) in the memory 272, in operation S311. The stored compensation value may also be used by the variable attenuator 256 in the next self-calibration operation.

When the aforementioned self-calibration operation of the antenna module 250 is completed, the controller 270 notifies the communication module 210 that the cable loss check has been completed, in operation S312.

Upon reception of the notification from the antenna module 250 that the cable loss check has been completed, the communication module 210 enters to a normal mode in operation S312 and sends a loss check complete command to the antenna module 250, in operation S314. In the normal mode, the communication module 210 stops outputting the test RF signal.

Upon reception of the loss check complete command from the communication module 210, the controller 270 of the antenna module 250 controls the antenna switch 277 into the normal mode in operation S315 and notifies the communication module 210 that the antenna module 250 is ready for communication in operation S316. In the normal mode, the antenna switch 277 blocks the connection of its input line of the antenna switch 277 to the equivalent load for test 278 (see FIG. 4) but connects the input line to the antenna 279.

When receiving the notification from the antenna module 250 that the antenna module 250 is ready for communication, the communication module 210 notifies the processor of the electronic control device that it is ready for communication in operation S317.

Although the operation method as described above in connection with FIG. 5 assumes that the communication module 210 includes a circuit for transmitting the TX serial communication signal 223, the communication module 210 may not include the circuit in some other embodiments of the disclosure.

Figure 6:
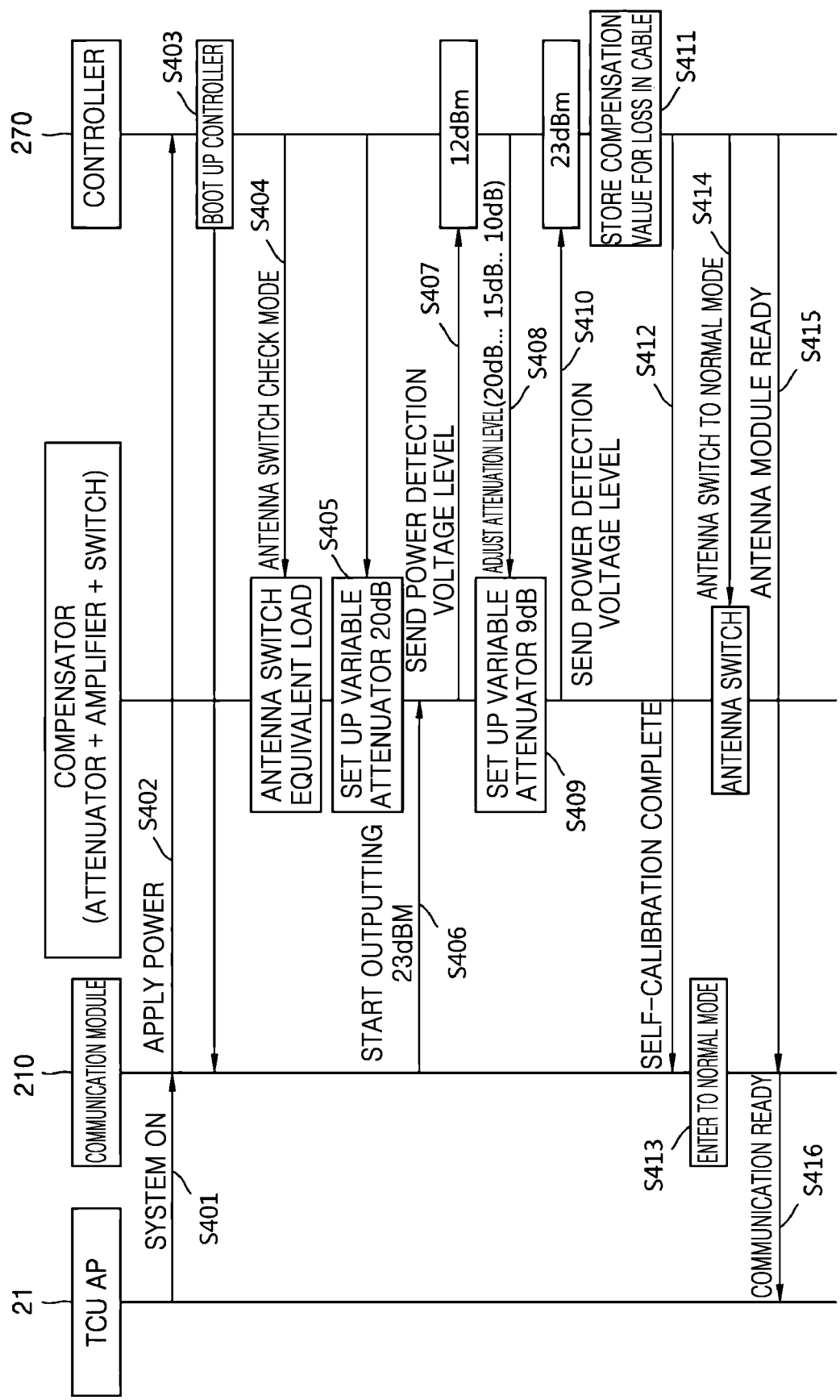
FIG. 6 is a flowchart illustrating a method of operating a high frequency communication apparatus for vehicle, according to another embodiment of the disclosure.

FIG. 6 is a flowchart illustrating a method of operating a high frequency communication apparatus for vehicle, according to another embodiment of the disclosure, where the communication module 210 may not include a circuit for transmitting the TX serial communication signal 223.

Referring to FIG. 6, the communication module 210 of the high frequency communication apparatus for vehicle receives a system activation command from the processor (e.g., TCU AP) 21 of the electronic control device in operation S401, and then applies power to the antenna module 250 in operation S402.

When powered on, the antenna module 250 boots up the controller 270 and notifies the communication module 210 that the controller 270 is booted up in operation S403.

The controller 270 may start self-calibration whenever booted up. In other words, the controller 270 controls the antenna switch 277 into the check mode, in operation S404. The TX/RX switch 253 of the antenna module 250 may be in the TX mode when the antenna module 250 is powered on. Alternatively, the TX/RX switch 253 is in the RX mode when the antenna module 250 is powered on, and may be switched into the TX mode when the antenna module 250 receives the TX/RX control signal for the TX mode from the communication module 210.

The controller 270 sets the attenuation level of the variable attenuator 256 to an initial attenuation level, in operation S405. For example, the initial attenuation level may be 20 dB.

The communication module 210 outputs a test RF signal at certain power for the self-calibration operation of the antenna module 250 in operation S406 each time the communication module 210 is notified from the antenna module 250 that the controller 270 is booted up. For example, the output power of the test RF signal from the communication module 210 may be 23 dBm. The output power of the test RF signal from the communication module 210 is known by the antenna module 250 in advance. For example, the memory 272 of the antenna module 250 may have stored information about the output power of the test RF signal from the communication module 210 at the time of shipment or installation in the vehicle.

The variable attenuator 256 of the antenna module 250 receives and attenuates the test RF signal to the initial attenuation level, and outputs the result to the FEM 257. The FEM 257 detects the power of the amplified test RF signal. For example, the FEM 257 may detect a voltage level of the amplified test RF signal. The detected power value of the test RF signal is forwarded to the controller 270, in operation S407. For example, the detected power of the test RF signal may be 12 dBm. The controller 270 compares the detected power value of the test RF signal with the output information of the test RF signal from the communication module 210 to determine an attenuation level to compensate for the loss in the cable 290 and adjusts the attenuation level of the variable attenuator 256, in operation S409. The FEM 257 detects the adjusted power of the test RF signal and forwards the adjusted power value of the test RF signal to the controller 270, in operation S410. For example, when the output of the test RF signal from the communication module 210 is 23 dBm and the detected power of the test RF signal at the initial attenuation level 20 dB of the variable attenuator 256 is 12 dBm, the FEM 257 may be able to make the input test RF signal have power of 23 dBm by adjusting the attenuation level of the variable attenuator 256 to 9 dB. The controller 270 may store a compensation value for compensating the adjusted power of the test RF signal (i.e., an adjusted attenuation level of the variable attenuator 256) in the memory 272, in operation S411. The stored compensation value may also be used by the variable attenuator 256 in the next self-calibration operation.

When the aforementioned self-calibration operation of the antenna module 250 is completed, the controller 270 notifies the communication module 210 that the cable loss check has been completed, in operation S412.

When receiving the notification from the antenna module 250 that the cable loss check has been completed, the communication module 210 stops outputting the test RF signal and enters into the normal mode in operation S413.

The controller 270 of the antenna module 250 notifies the communication module 210 that the cable loss check has been completed, and controls the antenna switch 277 into the normal mode, in operation S414. In the normal mode, the antenna switch 277 blocks the connection of the input line of the antenna switch 277 to the equivalent load for test 278 (see FIG. 4) but connects the line to the antenna 279. Furthermore, the controller 270 notifies the communication module 210 that the antenna module 250 has been ready for communication, in operation S415.

When receiving the notification from the antenna module 250 that the antenna module 250 has been ready for communication, the communication module 210 notifies the processor of the electronic control device that it is ready for communication in operation S416.

The operation method as described above in connection with FIG. 6 is performed before the communication module 210 transmits the TX serial communication signal (i.e., a control command) to the antenna module 250.

While an RX serial communication signal is sent from the antenna module 250 to the communication module 210 in the operation method in connection with FIG. 6, the antenna module 250 may perform the self-calibration operation without the RX serial communication signal. For example, when the communication module 210 receives a system activation command from the processor 21 of the electronic control device, the communication module 210 may apply power and output a test RF signal to the antenna module 250 for a certain period of time, and after the lapse of the certain period of time, stops outputting the test RF signal and enters into the normal mode, and for the certain period of time, the antenna module 250 may perform the self-calibration operation.

Figure 7:
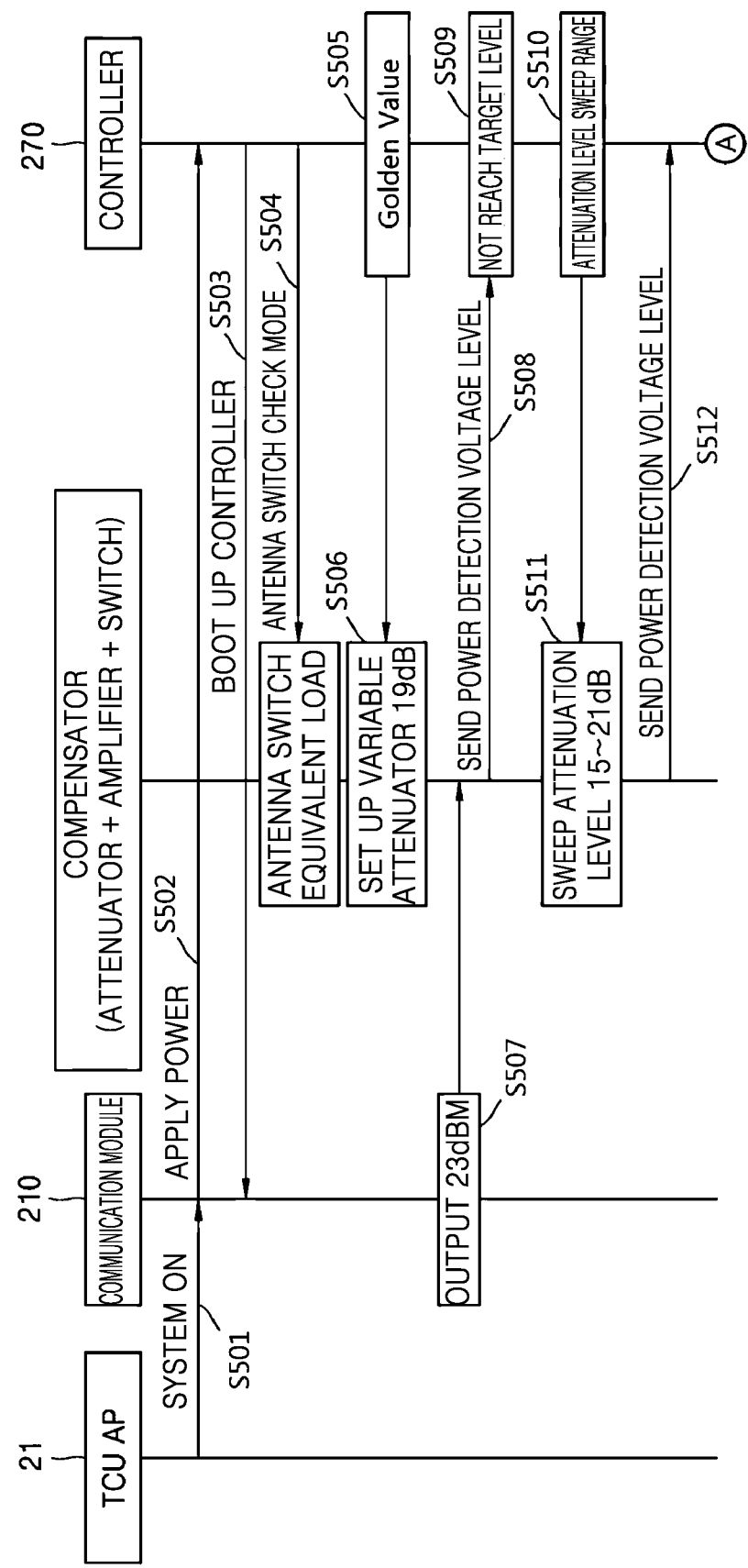
FIG. 7 is a flowchart illustrating a method of operating a high frequency communication apparatus for vehicle, according to another embodiment of the disclosure.
Figure 8:
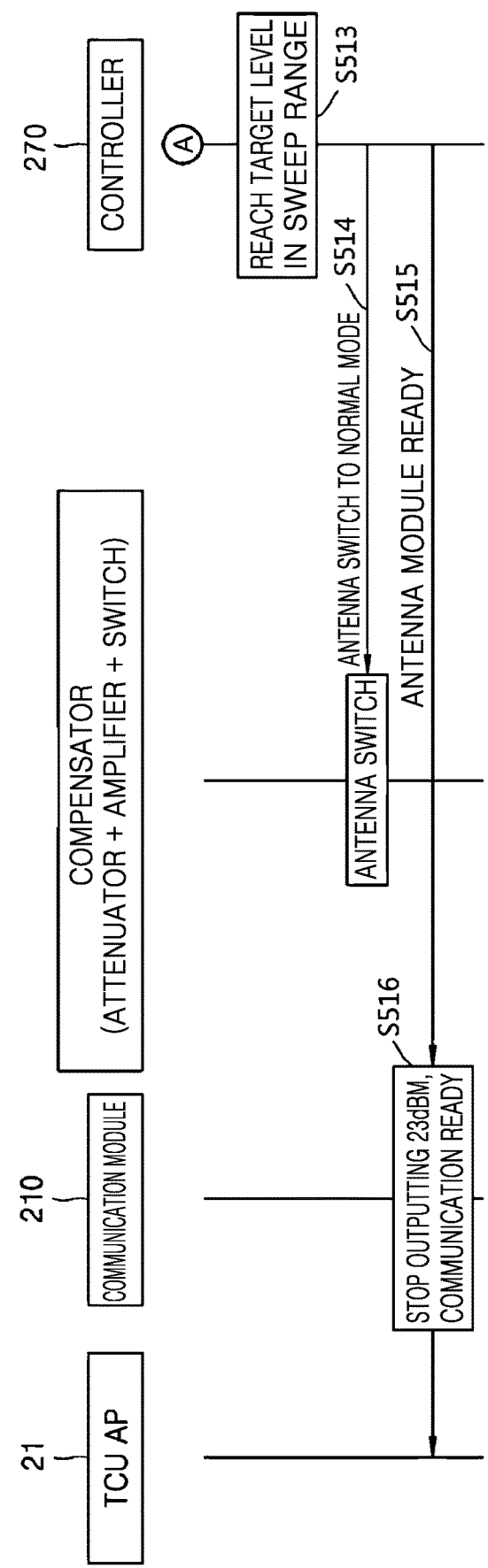
FIG. 8 is a flowchart illustrating subsequent operations to FIG. 7 when a target level is reached in a sweep range.
Figure 9:
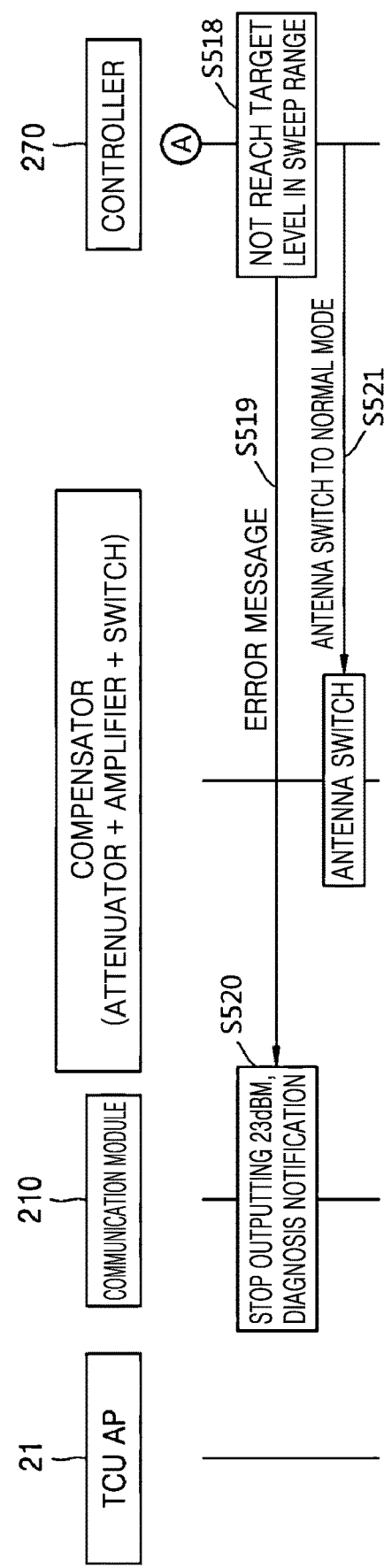
FIG. 9 is a flowchart illustrating subsequent operations to FIG. 7 when a target level is not reached in a sweep range.

FIG. 7 is a flowchart illustrating a method of operating a high frequency communication apparatus for vehicle, according to another embodiment of the disclosure, FIG. 8 is a flowchart illustrating subsequent operations to FIG. 7 when a target level is reached in a sweep range, and FIG. 9 is a flowchart illustrating subsequent operations to FIG. 7 when a target level is not reached in a sweep range.

Referring to FIG. 7, the communication module 210 of the high frequency communication apparatus for vehicle receives a system activation command from the processor (e.g., TCU AP) 21 of the electronic control device in operation S501, and then applies power to the antenna module 250 in operation S502.

When powered on, the antenna module 250 boots up the controller 270 and notifies the communication module 210 that the controller 270 is booted up in operation S503.

The controller 270 may start self-calibration whenever booted up. In other words, the controller 270 controls the antenna switch 277 into the check mode, in operation S504. The TX/RX switch 253 of the antenna module 250 may be in the TX mode when the antenna module 250 is powered on. Alternatively, the TX/RX switch 253 is in the RX mode when the antenna module 250 is powered on, and may be switched into the TX mode when the antenna module 250 receives the TX/RX control signal for the TX mode from the communication module 210.

The controller 270 reads out a previous calibration value (called the golden value) stored in the memory 272 in operation S505, and sets the attenuation level of the variable attenuator 256 to the previous calibration value, in operation S506. For example, the previous calibration value of the attenuation level may be 19 dB.

The communication module 210 outputs a test RF signal at certain power for the self-calibration operation of the antenna module 250 in operation S507 each time the communication module 210 is notified from the antenna module 250 that the controller 270 is booted up. For example, the output power of the test RF signal from the communication module 210 may be 23 dBm. The output power of the test RF signal from the communication module 210 is known by the antenna module 250 in advance. For example, the memory 272 of the antenna module 250 may have stored information about the output power of the test RF signal from the communication module 210 at the time of shipment or installation in the vehicle.

The variable attenuator 256 of the antenna module 250 receives and attenuates the test RF signal to the previous calibration value, and inputs the result to the FEM 257. The FEM 257 detects power of the amplified test RF signal. For example, the FEM 257 may detect a voltage level of the amplified test RF signal. The detected power value of the test RF signal is forwarded to the controller 270, in operation S508.

The detected power of the test RF signal may not reach a target level, in operation S509. For example, the target level is 23 dBm and the detected power may be 12 dBm. In this case that the detected power does not reach the target level, the controller 270 reads out an attenuation sweep range from the memory 272 in operation S510, and adjusts the attenuation level of the variable attenuator 256 in the attenuation sweep range in operation S511.

While the attenuation level of the variable attenuator 256 is adjusted, the FEM 257 detects the adjusted power of the test RF signal for every adjusted attenuation level and sends the adjusted power value to the controller 270 in operation S512.

Referring to FIG. 8, when the target level is reached in the sweep range in operation S513, the controller 270 of the antenna module 250 controls the antenna switch 277 into the normal mode in operation S514, and notifies the communication module 210 that the antenna module 250 has been ready for communication in operation S515. When receiving the notification from the antenna module 250 that the antenna module 250 has been ready for communication, the communication module 210 stops outputting the test RF signal and notifies the processor of the electronic control device that it is ready for communication in operation S516.

Referring to FIG. 9, when the target level is not reached in the sweep range in operation S518, the controller 270 of the antenna module 250 notifies the communication module 210 of an error message in operation S519.

When receiving the notification from the antenna module 250 of the error message, the communication module 210 stops outputting the test RF signal and notifies the processor of the electronic control device of a diagnosis result in operation S520.

In the meantime, the controller 270 of the antenna module 250 controls the antenna switch 277 into the normal mode, allowing the RF signal to be received, in operation S521.

The operation method as described above in connection with FIGS. 7 to 9 is performed before the communication module 210 transmits the TX serial communication signal (i.e., a control command) to the antenna module 250, but is not limited thereto. For example, the operation method described above in connection with FIG. 5 may be applied to the operation method in connection with FIGS. 7 to 9.

Figure 10:
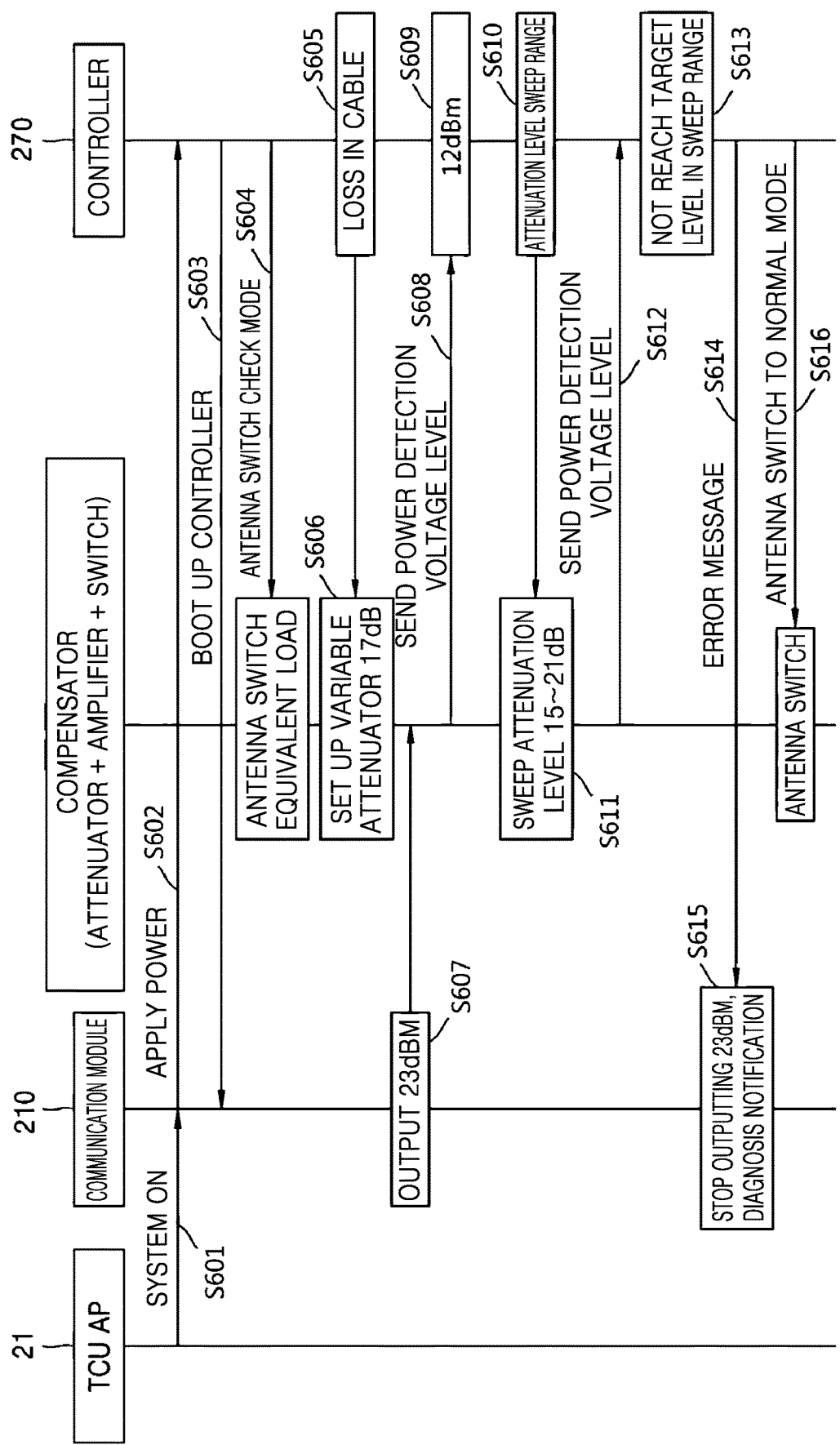
FIG. 10 is a flowchart illustrating a method of operating a high frequency communication apparatus for vehicle, according to another embodiment of the disclosure.

FIG. 10 is a flowchart illustrating a method of operating a high frequency communication apparatus for vehicle, according to another embodiment of the disclosure. The method of the operating in this embodiment of the disclosure is substantially the same as the operation method as described above in connection with FIGS. 7 to 9 except that it uses a cable loss instead of the previous calibration value (golden value) stored in the memory 272, so the following description will be focused on the difference.

Referring to FIG. 10, the communication module 210 of the high frequency communication apparatus for vehicle receives a system activation command from the processor (e.g., TCU AP) 21 of the electronic control device in operation S601, and then applies power to the antenna module 250 in operation S602. When powered on, the antenna module 250 boots up the controller 270 and notifies the communication module 210 that the controller 270 is booted up in operation S603. Whenever booted up, the controller 270 controls the antenna switch 277 into the check mode, in operation S604.

The controller 270 reads out a cable loss value stored in the memory 272 in operation S605, and sets the attenuation level of the variable attenuator 256 based on the stored cable loss value, in operation S606. For example, the cable loss value may be 7 dB, and the attenuation level of the variable attenuator 256 calculated based on the cable loss value may be 17 dB. The cable loss value may be given from specification information provided by the manufacturer of the cable 290. The cable loss value may be stored in the memory 272 of the antenna module 250 at the time of shipment or installation in the vehicle.

The communication module 210 outputs a test RF signal at certain power for the self-calibration operation of the antenna module 250 in operation S607 each time the communication module 210 is notified from the antenna module 250 that the controller 270 is booted up. For example, the output power of the test RF signal from the communication module 210 may be 23 dBm. The output power of the test RF signal from the communication module 210 is known by the antenna module 250 in advance.

The FEM 257 detects the power of the amplified test RF signal and sends the detected power value of the test RF signal to the controller 270, in operation S608.

The detected power of the test RF signal may not reach a target level, in operation S609. For example, the target level is 23 dBm and the detected power may be 12 dBm. In this case that the detected power does not reach the target level, the controller 270 reads out an attenuation sweep range from the memory 272 in operation S610, and adjusts the attenuation level of the variable attenuator 256 in the attenuation sweep range in operation S611.

While the attenuation level of the variable attenuator 256 is adjusted, the FEM 257 detects the adjusted power of the test RF signal for every adjusted attenuation level and sends the adjusted power value to the controller 270 in operation S612.

When the target level is not reached in the sweep range in operation S618, the controller 270 of the antenna module 250 notifies the communication module 210 of an error message in operation S614. In the meantime, the controller 270 of the antenna module 250 controls the antenna switch 277 into the normal mode, allowing the RF signal to be received, in operation S616.

When receiving the notification from the antenna module 250 of the error message, the communication module 210 stops outputting the test RF signal and notifies the processor of the electronic control device of a diagnosis result in operation S615.

When the target level is reached in the sweep range (not shown in FIG. 10), the controller 270 of the antenna module 250 controls the antenna switch 277 into the normal mode, and notifies the communication module 210 that the antenna module 250 has been ready for communication.

When the input power of the TX RF signal 254 input to the FEM 257 is excessively large, linearity of output signals becomes bad, causing an electromagnetic compatibility (EMC) issue and there may be a durability problem and errors in the FEM 257 due to the high input power. On the contrary, when the input power is too small, signals may not be output at desired power. Hence, the antenna module 250 may accurately determine the input power of the TX RF signal 254 input to the FEM 257 by precisely adjusting the attenuation level of the variable attenuator 256 through the self-calibration operation as described above in the above embodiments of the disclosure.

The self-calibration as described above may also be used in detecting an assembly failure occurring in an assembling process of the high frequency communication apparatus for vehicle. For example, when the output power detected from the FEM 257 in the first self-calibration does not reach target power in the attenuation level sweep range, it may be determined that there is an assembly failure.

As described above, as the antenna module 150 or 250 performs self-compensation for cable loss, a power signal fed back to the communication module 110 or 210 is not required and neither is the power control at the communication module 110 or 210 required. This means that the antenna module 150 or 250 may be used with the same compensator configuration no matter which scheme or solution the communication module 110 or 210 has. In other words, the high frequency communication apparatus in the disclosure may compensate for signal attenuation by using the compensator in the antenna module 150 or 250 by a simple operation, no matter which type of communication module is coupled to the antenna module 150 or 250.

As the high frequency communication apparatus uses the single cable 190 or 290 for the compensation operation for a signal loss in the cable, the vehicle manufacturer may save the cost of extra cables and solve constraints of design or space for the extra cables.

The high frequency communication apparatus may be implemented in hardware, software, and/or a combination thereof. For example, the high frequency communication apparatus may be implemented with one or more general purpose computers or special purpose computers such as a processor, an arithmetic logic unit (ALU), an application specific integrated circuit (ASIC), a digital signal processor (DSP), a digital signal processing device (DSPD), a programmable logic device (PLD), a microcomputer, a microprocessor, or any device capable of executing and responding to instructions.

The software may include a computer program, codes, instructions, or one or more combinations of them, and may configure a processing device to operate as desired or instruct the processing device independently or collectively.

The software may be implemented with a computer program including instructions stored in a computer-readable recording (or storage) medium. Examples of the computer-readable recording medium include a magnetic storage medium (e.g., a read only memory (ROM), a floppy disk, a hard disk, etc.), and an optical recording medium (e.g., a compact disc ROM (CD-ROM), or a digital versatile disc (DVD)). The computer-readable recording medium may also be distributed over network coupled computer systems so that the computer-readable code is stored and executed in a distributed fashion. This media may be read by the computer, stored in the memory, and executed by the processor.

The computer is a device capable of calling out instructions stored in a storage medium and operating under the instructions as in the embodiments of the disclosure, and may include the high frequency communication apparatus according to the embodiments of the disclosure.

The computer-readable storage medium may be provided in the form of a non-transitory storage medium. The term 'non-transitory' only means that the storage medium is tangible and does not refer to a transitory electrical signal, but does not distinguish that data is stored semi-permanently or temporarily in the storage medium.

Furthermore, the high frequency communication apparatus or method for vehicle may be included and provided in a computer program product. The computer program product may be traded between a seller and a buyer as a commercial product.

The computer program product may include a software program and a computer-readable storage medium having the software program stored thereon. For example, the computer program product may include a product in the form of a software program that is electronically distributed by the manufacturer of the high frequency communication apparatus for vehicle or by an electronic market (e.g., Google Play Store®, or App Store®). For the electronic distribution, at least a portion of the software program may be stored in a storage medium or temporarily created. In this case, the storage medium may be one of a server of the manufacturer or of a relay server that temporarily stores the software program.

In a system including a server and a terminal (e.g., the high frequency communication apparatus for vehicle), the computer program product may include a storage medium of the server or a storage medium of the terminal. Alternatively, when there is a third device (e.g., a smart phone) communicatively connected to the server or the terminal, the computer program product may include a storage medium of the third device. In another example, the computer program product may be transmitted from the server to the terminal or the third party, or may include a software program itself that is transmitted from the third device to the terminal.

In this case, one of the server, the terminal, and the third device may execute the computer program product to perform the method according to the embodiments of the disclosure. Alternatively, two or more of the server, the terminal, and the third device may execute the computer program product to perform the method according to the embodiments of the disclosure in a distributed fashion.

For example, the server (e.g., a cloud server or an artificial intelligence (AI) server) may execute the computer program product stored therein to control the terminal communicatively connected to the server to perform the method according to the embodiments of the disclosure.

In yet another example, the third device may execute the computer program product to control the terminal communicatively connected to the third device to perform the method according to the embodiments of the disclosure.

In the case that the third device executes the computer program product, the third device may download the computer program product and execute the downloaded computer program product. Alternatively, the third device may execute the computer program product that is preloaded to perform the method according to the embodiments of the disclosure.

According to the disclosure, a high frequency communication apparatus and method for vehicle with an antenna module, a communication module, and a single cable connecting the antenna module and the communication module, capable of compensating for signal attenuation in the cable may be provided.

According to the disclosure, a high frequency communication apparatus and method for vehicle capable of compensating for signal attenuation with a simple operation even when the antenna module is coupled to various types of communication module may be provided.

According to the disclosure, an assembly failure or progressive fault of the high frequency communication apparatus for vehicle may be diagnosed even with the antenna module and the communication module connected by the single cable.

According to the disclosure, self-calibration is performed in various vehicles, so that the possibility of having performance differences due to variations in assembly and parts of the high frequency communication apparatus for vehicle may be reduced.

Several embodiments of the disclosure of the high frequency communication apparatus and method for vehicle have been described above, but a person of ordinary skill in the art will understand and appreciate that various modifications can be made without departing the scope of the disclosure. Thus, it will be apparent to those of ordinary skill in the art that the true scope of technical protection is only defined by the following claims.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. A high frequency communication apparatus for vehicle comprising:
a communication circuitry configured to process a radio frequency (RF) signal;
a single cable having one end connected to the communication circuitry; and
an antenna module connected to an other end of the single cable and configured to transmit, through an antenna, the RF signal delivered from the communication circuitry, the antenna module comprising a compensator configured to compensate for a loss of the RF signal in the single cable and a controller configured to determine an amount of compensation for the loss in the single cable based on power of the RF signal transmitted from the compensator,
wherein the communication circuitry is separated from the antenna module and connected by the single cable to the antenna module and the communication circuitry and the antenna module are installed in the vehicle,
wherein the communication circuitry is further configured to transmit a transmission (TX)/reception (RX) control signal to control an TX mode or an RX mode for the RF signal to the antenna module through the single cable,
wherein the antenna module further comprises an TX/RX switch configured to receive the TX/RX control signal and switch between the TX mode and the RX mode for the RF signal,
wherein the TX/RX switch forwards the RF signal transmitted through the single cable to the compensator in the TX mode and forwards a RX RF signal received at the antenna onto the single cable in the RX mode,
wherein the TX mode and the RX mode do not occur simultaneously,
wherein the communication circuitry comprises a first oscillator and a first direct current (DC) to alternate current (AC) circuit configured to modulate the TX/RX control signal to a first AC signal in a first frequency band, a second oscillator and a second DC to AC circuit configured to modulate an TX serial communication signal to a second AC signal in a second frequency band different from the first frequency band, and a first AC to DC circuit configured to demodulate a third AC signal to an RX serial communication signal, and
wherein the first AC signal, the second AC signal, and the third AC signal are transmitted between the communication circuitry and the antenna module through the single cable.

2. The high frequency communication apparatus for vehicle of claim 1, wherein the compensator comprises an amplifier for transmission, and a variable attenuator arranged in front of the amplifier for transmission and configured to be able to adjust an attenuation level.

3. The high frequency communication apparatus for vehicle of claim 2, wherein the amplifier for transmission is a pre-amplifier and/or a low noise amplifier.

4. The high frequency communication apparatus for vehicle of claim 2, wherein the antenna module further comprises a detection circuit configured to detect power of the RF signal amplified by the amplifier for transmission.

5. The high frequency communication apparatus for vehicle of claim 1, wherein the antenna module further comprises a memory configured to store information about self-calibration.

6. The high frequency communication apparatus for vehicle of claim 1, wherein the controller of the antenna module is configured to output and transmit the RX serial communication signal to the communication circuitry,
wherein the communication circuitry is further configured to receive the RX serial communication signal, and
wherein the RX serial communication signal includes information about self-calibration of the antenna module.

7. The high frequency communication apparatus for vehicle of claim 6, wherein the communication circuitry is further configured to output and transmit the TX serial communication signal to the antenna module,
wherein the antenna module is configured to receive the TX serial communication signal, and
wherein the TX serial communication signal includes a control command for self-calibration of the antenna module and a command to check the loss in the single cable.

8. The high frequency communication apparatus for vehicle of claim 7, wherein the RF signal, the TX/RX control signal, the TX serial communication signal, and the RX serial communication signal all have different frequencies.

9. The high frequency communication apparatus for vehicle of claim 1, wherein the communication circuitry is further configured to supply power to the antenna module through the single cable.

10. The high frequency communication apparatus for vehicle of claim 1, wherein the single cable is a coaxial cable.

11. An antenna module connected through a single cable to a communication circuitry configured to process a radio frequency (RF) signal, and to transmit through an antenna the RF signal sent from the communication circuitry, the antenna module comprising:
 a compensator configured to compensate for a loss of the RF signal in the single cable; and
 a controller configured to control an amount of compensation of the compensator based on power of the RF signal transmitted from the compensator,
 wherein the communication circuitry is separated from the antenna module and connected by the single cable to the antenna module and the communication circuitry and the antennal module are installed in a vehicle,
 wherein the communication circuitry is further configured to transmit a transmission (TX)/reception (RX) control signal to control an TX mode or an RX mode for the RF signal to the antenna module through the single cable,
 wherein the antenna module further comprises an TX/RX switch configured to receive the TX/RX control signal and switch between the TX mode and the RX mode for the RF signal,
 wherein the TX/RX switch forwards the RF signal transmitted through the single cable to the compensator in the TX mode and forwards a RX RF signal received at the antenna onto the single cable in the RX mode,
 wherein the TX mode and the RX mode do not occur simultaneously,
 wherein the communication circuitry comprises a first oscillator and a first direct current (DC) to alternate current (AC) circuit configured to modulate the TX/RX control signal to a first AC signal in a first frequency band, a second oscillator and a second DC to AC circuit configured to modulate an TX serial communication signal to a second AC signal in a second frequency band different from the first frequency band, and a first AC to DC circuit configured to demodulate a third AC signal to an RX serial communication signal, and
 wherein the first AC signal, the second AC signal, and the third AC signal are transmitted between the communication circuitry and the antenna module through the single cable.

12. The antenna module of claim 11, wherein the compensator comprises an amplifier for transmission, and a variable attenuator arranged in front of the amplifier for transmission and configured to be able to adjust an attenuation level.

13. The antenna module of claim 12, the antenna module further comprising a detection circuit configured to detect power of the RF signal amplified by the amplifier for transmission.

14. The antenna module of claim 11, the antenna module further comprising a memory configured to store information about self-calibration.

15. The antenna module of claim 11, wherein the controller of the antenna module is further configured to output and transmit the RX serial communication signal to the communication circuitry,
 wherein the communication circuitry is configured to receive the RX serial communication signal, and
 wherein the RX serial communication signal includes information about self-calibration of the antenna module.

16. A high frequency communication method for vehicle comprising:
 starting cable loss check;
 receiving a test radio frequency (RF) signal from a communication circuitry through a single cable;
 detecting power of the test RF signal amplified by a compensator;
 determining an amount of compensation for a loss in the single cable based on the power of the RF signal transmitted from the compensator; and
 compensating the RF signal transmitted from the communication circuitry based on the amount of compensation of the compensator,
 wherein the communication circuitry is separated from an antenna module and connected by the single cable to the antenna module and the communication circuitry and the antennal module are installed in the vehicle,
 wherein the communication circuitry is configured to transmit a transmission (TX)/reception (RX) control signal to control an TX mode or an RX mode for the RF signal to the antenna module through the single cable,
 wherein the antenna module further includes an TX/RX switch configured to receive the TX/RX control signal and switch between the TX mode and the RX mode for the RF signal,
 wherein the TX/RX switch forwards the RF signal transmitted through the single cable to the compensator in the TX mode and forwards a RX RF signal received at an antenna onto the single cable in the RX mode,
 wherein the TX mode and the RX mode do not occur simultaneously,
 wherein the communication circuitry comprises a first oscillator and a first direct current (DC) to alternate current (AC) circuit configured to modulate the TX/RX control signal to a first AC signal in a first frequency band, a second oscillator and a second DC to AC circuit configured to modulate an TX serial communication signal to a second AC signal in a second frequency band different from the first frequency band, and a first AC to DC circuit configured to demodulate a third AC signal to an RX serial communication signal, and
 wherein the first AC signal, the second AC signal, and the third AC signal are transmitted between the communication circuitry and the antenna module through the single cable.

17. The high frequency communication method of claim 16, wherein the starting of the cable loss check comprises:
 receiving a control command requesting the start of the cable loss check from the communication circuitry;
 connecting a line of an antenna switch to an equivalent load for test;
 setting the amount of compensation of the compensator to a preset value; and
 switching the TX/RX switch into the TX mode.

18. The high frequency communication method of claim 17, wherein the preset value for the amount of compensation of the compensator comprises a calibration value obtained from a previous calibration or a known loss value of the single cable.

\* \* \* \* \*